US012033364B2

(12) United States Patent
Xu et al.

(10) Patent No.: US 12,033,364 B2
(45) Date of Patent: Jul. 9, 2024

(54) METHOD, SYSTEM, AND COMPUTER-READABLE MEDIUM FOR USING FACE ALIGNMENT MODEL BASED ON MULTI-TASK CONVOLUTIONAL NEURAL NETWORK-OBTAINED DATA

(71) Applicant: GUANGDONG OPPO MOBILE TELECOMMUNICATIONS CORP., LTD., Dongguan (CN)

(72) Inventors: Runsheng Xu, Palo Alto, CA (US); Fan Deng, Palo Alto, CA (US); Chiuman Ho, Palo Alto, CA (US)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 376 days.

(21) Appl. No.: 17/590,160

(22) Filed: Feb. 1, 2022

(65) Prior Publication Data
US 2022/0156951 A1 May 19, 2022

Related U.S. Application Data

(63) Continuation of application No. PCT/CN2020/107199, filed on Aug. 5, 2020.
(Continued)

(51) Int. Cl.
*G06V 10/24* (2022.01)
*G06T 7/30* (2017.01)
(Continued)

(52) U.S. Cl.
CPC .............. *G06V 10/242* (2022.01); *G06T 7/30* (2017.01); *G06V 10/454* (2022.01);
(Continued)

(58) Field of Classification Search
CPC ............ G06T 7/30; G06T 2207/30201; G06V 10/82; G06V 40/161; G06V 40/168; G06V 40/174
See application file for complete search history.

(56) References Cited

U.S. PATENT DOCUMENTS

| 2014/0043329 | A1 | 2/2014 | Wang et al. |
| 2018/0211099 | A1 | 7/2018 | Ranjan et al. |

(Continued)

FOREIGN PATENT DOCUMENTS

| CN | 103824049 A | 5/2014 |
| CN | 105760836 A | 7/2016 |

(Continued)

OTHER PUBLICATIONS

International Search Report and Written Opinion dated Oct. 29, 2020 in International Application No. PCT/CN2020/107199.

*Primary Examiner* — Diane D Mizrahi
(74) *Attorney, Agent, or Firm* — Sheppard, Mullin, Richter & Hampton, LLP

(57) ABSTRACT

A method includes receiving a facial image; receiving a facial image; and obtaining, using a multi-task convolutional neural network, a detected face location and a facial characteristic category set of a plurality of first facial characteristic categories; selecting a first face alignment model from a plurality of face alignment models based on the facial characteristic category set; and obtaining, using the first face alignment model, a plurality of facial landmarks. The first facial characteristic categories are arranged hierarchically. A hierarchy of the first facial characteristic categories includes a plurality of first levels corresponding to a plurality of corresponding facial characteristics. The facial characteristic category set includes the first facial characteristic categories of a path of the hierarchy of the first facial characteristic categories.

20 Claims, 12 Drawing Sheets

Related U.S. Application Data

(60) Provisional application No. 62/893,713, filed on Aug. 29, 2019.

(51) Int. Cl.
  *G06V 10/44* (2022.01)
  *G06V 10/764* (2022.01)
  *G06V 10/82* (2022.01)
  *G06V 40/16* (2022.01)

(52) U.S. Cl.
  CPC ............ *G06V 10/764* (2022.01); *G06V 10/82* (2022.01); *G06V 40/161* (2022.01); *G06V 40/168* (2022.01); *G06V 40/171* (2022.01); *G06V 40/174* (2022.01); *G06T 2207/30201* (2013.01)

(56) References Cited

U.S. PATENT DOCUMENTS

2019/0122329 A1  4/2019  Wang et al.
2021/0049757 A1* 2/2021  Zhu ........................... G06T 7/32

FOREIGN PATENT DOCUMENTS

CN  109359575 A  2/2019
WO  2016026063 A1  2/2016

* cited by examiner

METHOD, SYSTEM, AND COMPUTER-READABLE MEDIUM FOR USING FACE ALIGNMENT MODEL BASED ON MULTI-TASK CONVOLUTIONAL NEURAL NETWORK-OBTAINED DATA

CROSS-REFERENCE TO RELATED APPLICATIONS

The present application is a continuation of International Application No. PCT/CN2020/107199 filed on Aug. 5, 2020, which claims priority to U.S. Patent Application No. 62/893,713 filed on Aug. 29, 2019, the entire contents of which are incorporated herein by reference.

BACKGROUND

1. Field of Disclosure

The present disclosure relates to the field of face alignment, and more particularly, to a method, a system, and a computer-readable medium for using a face alignment model based on a multi-task convolutional neural network-obtained data.

2. Description of Related Art

Face alignment plays an essential role in face recognition, face animation, 3D face reconstruction, virtual makeup, etc. The goal of face alignment is to locate fiducial facial key points (i.e. facial landmarks) around facial components and facial contours in facial images.

SUMMARY

An object of the present disclosure is to propose a method, a system, and a computer-readable medium for using a face alignment model based on a multi-task convolutional neural network-obtained data.

In a first aspect of the present disclosure, a computer-implemented method includes: receiving a facial image; and obtaining, using a multi-task convolutional neural network using the facial image, a detected face location and a facial characteristic category set of a plurality of first facial characteristic categories. The first facial characteristic categories are arranged hierarchically. A hierarchy of the first facial characteristic categories includes a plurality of first levels corresponding to a plurality of corresponding facial characteristics. Each facial characteristic corresponds to a corresponding plurality of second facial characteristic categories of the first facial characteristic categories. Each first level includes at least one corresponding node set. Each of the at least one node set includes a plurality of corresponding nodes. The nodes correspond to the corresponding second facial characteristic categories. When there are a plurality of the node sets, the corresponding second facial characteristic categories for each of the node sets are same. The facial characteristic category set includes the first facial characteristic categories of a path of the hierarchy of the first facial characteristic categories. The path is from one node of the at least one node set of the highest level of the first levels to one node of the at least one node set of the lowest level of the first levels. The computer-implemented method further includes: selecting a first face alignment model from a plurality of face alignment models based on the facial characteristic category set. The face alignment models correspond to a plurality of corresponding paths of the hierarchy of the first facial characteristic categories. Each path is from a corresponding node of the at least one node set of the highest level of the first levels to a corresponding node of the at least one node set of the lowest level of the first levels. The computer-implemented method further includes: obtaining, using the first face alignment model using the facial image and the detected face location, a plurality of facial landmarks.

In a second aspect of the present disclosure, a system includes at least one memory and at least one processor. The at least one memory is configured to store program instructions. The at least one processor is configured to execute the program instructions, which cause the at least one processor to perform steps including: receiving a facial image; and obtaining, using a multi-task convolutional neural network using the facial image, a detected face location and a facial characteristic category set of a plurality of first facial characteristic categories. The first facial characteristic categories are arranged hierarchically. A hierarchy of the first facial characteristic categories includes a plurality of first levels corresponding to a plurality of corresponding facial characteristics. Each facial characteristic corresponds to a corresponding plurality of second facial characteristic categories of the first facial characteristic categories. Each first level includes at least one corresponding node set. Each of the at least one node set includes a plurality of corresponding nodes. The nodes correspond to the corresponding second facial characteristic categories. When there are a plurality of the node sets, the corresponding second facial characteristic categories for each of the node sets are same. The facial characteristic category set includes the first facial characteristic categories of a path of the hierarchy of the first facial characteristic categories. The path is from one node of the at least one node set of the highest level of the first levels to one node of the at least one node set of the lowest level of the first levels. The steps further includes: selecting a first face alignment model from a plurality of face alignment models based on the facial characteristic category set. The face alignment models correspond to a plurality of corresponding paths of the hierarchy of the first facial characteristic categories. Each path is from a corresponding node of the at least one node set of the highest level of the first levels to a corresponding node of the at least one node set of the lowest level of the first levels. The steps further includes: obtaining, using the first face alignment model using the facial image and the detected face location, a plurality of facial landmarks.

In a third aspect of the present disclosure, a non-transitory computer-readable medium with program instructions stored thereon is provided. When the program instructions are executed by at least one processor, the at least one processor is caused to perform steps including: receiving a facial image; and obtaining, using a multi-task convolutional neural network using the facial image, a detected face location and a facial characteristic category set of a plurality of first facial characteristic categories. The first facial characteristic categories are arranged hierarchically. A hierarchy of the first facial characteristic categories includes a plurality of first levels corresponding to a plurality of corresponding facial characteristics. Each facial characteristic corresponds to a corresponding plurality of second facial characteristic categories of the first facial characteristic categories. Each first level includes at least one corresponding node set. Each of the at least one node set includes a plurality of corresponding nodes. The nodes correspond to the corresponding second facial characteristic categories. When there are a plurality of the node sets, the corresponding second facial characteristic categories for each of the node sets are same. The facial characteristic category set includes the first facial characteristic categories of a path of the hierarchy of the first facial characteristic categories. The path is from one node of the at least one node set of the highest level of the first levels to one node of the at least one node set of the lowest level of the first levels. The steps further includes: selecting a first face alignment model from a plurality of face alignment models based on the facial characteristic category set. The face alignment models correspond to a plurality of corresponding paths of the hierarchy of the first facial characteristic categories. Each path is from a corresponding node of the at least one node set of the highest level of the first levels to a corresponding node of the at least one node set of the lowest level of the first levels. The steps further includes: obtaining, using the first face alignment model using the facial image and the detected face location, a plurality of facial landmarks.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION OF EMBODIMENTS

Figure 1:
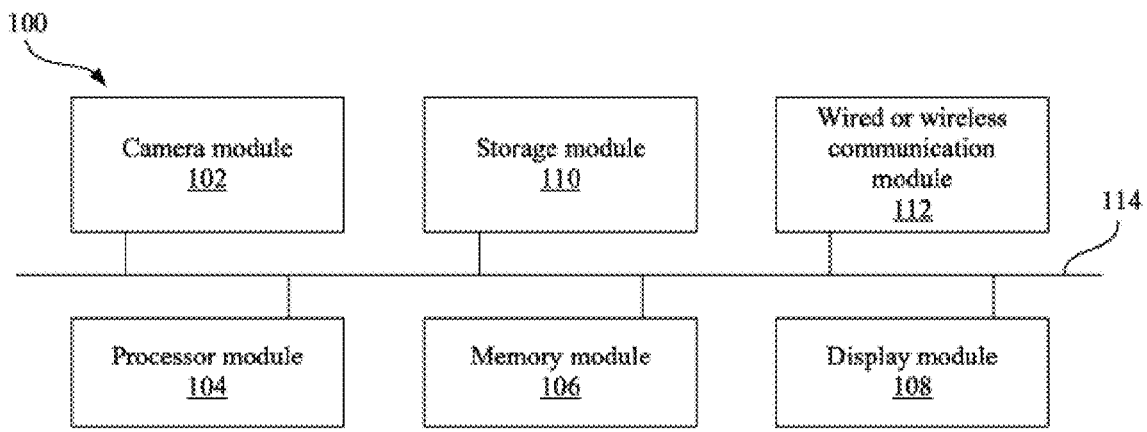
FIG. 1 is a block diagram illustrating inputting, processing, and outputting hardware modules in a terminal in accordance with an embodiment of the present disclosure.

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the invention.

Same reference numerals among different figures indicate substantially the same elements for one of which description is applicable to the others.

As used here, the term "using" refers to a case in which an object is directly employed for performing an operation, or a case in which the object is modified by at least one intervening operation and the modified object is directly employed to perform the operation.

FIG. 1 is a block diagram illustrating inputting, processing, and outputting hardware modules in a terminal 100 in accordance with an embodiment of the present disclosure. Referring to FIG. 1, the terminal 100 includes a camera module 102, a processor module 104, a memory module 106, a display module 108, a storage module 110, a wired or wireless communication module 112, and buses 114. The terminal 100 may be cell phones, smartphones, tablets, notebook computers, desktop computers, or any electronic device having enough computing power to perform face alignment.

The camera module 102 is an inputting hardware module and is configured to capture a facial image 208 (exemplarily labeled in FIG. 2) that is to be transmitted to the processor module 104 through the buses 114. The camera module 102 includes an RGB camera, or a grayscale camera. Alternatively, the facial image 208 may be obtained using another inputting hardware module, such as the storage module 110, or the wired or wireless communication module 112. The storage module 110 is configured to store the facial image 208 that is to be transmitted to the processor module 104 through the buses 114. The wired or wireless communication module 112 is configured to receive the facial image 208 from a network through wired or wireless communication, wherein the facial image 208 is to be transmitted to the processor module 104 through the buses 114.

The memory module 106 stores inference stage program instructions, and the inference stage program instructions are executed by the processor module 104, which causes the processor module 104 to implement a facial landmark obtaining software system 200 (exemplarily labeled in FIG. 2) to generate a plurality of facial landmarks 220 (exemplarily labeled in FIG. 2) for the facial image 208. The memory module 106 may be a transitory or non-transitory computer-readable medium that includes at least one memory. The processor module 104 includes at least one processor that sends signals directly or indirectly to and/or receives signals directly or indirectly from the camera module 102, the memory module 106, the display module 108, the storage module 110, and the wired or wireless communication module 112 via the buses 114. The at least one processor may be central processing unit(s) (CPU(s)), graphics processing unit(s) (GPU(s)), and/or digital signal processor(s) (DSP(s)). The CPU(s) may send the facial image 208, some of the program instructions and other data or instructions to the GPU(s), and/or DSP(s) via the buses 114.

The display module 108 is an outputting hardware module and is configured to display the facial landmarks 220 on the facial image 208, or an application result obtained using the facial landmarks 220 on the facial image 208 that is received from the processor module 104 through the buses 114. The application result may be from, for example, face recognition, face animation, 3D face reconstruction, and applying virtual makeup. Alternatively, the facial landmarks 220 on the facial image 208, or the application result obtained using the facial landmarks 220 on the facial image 208 may be output using another outputting hardware module, such as the storage module 110, or the wired or wireless communication module 112. The storage module 110 is configured to store the facial landmarks 220 on the facial image 208, or the application result obtained using the facial landmarks 220 on the facial image 208 that is received from the processor module 104 through the buses 114. The wired or wireless communication module 112 is configured to transmit the facial landmarks 220 on the facial image 208, or the application result obtained using the facial landmarks 220 on the facial image 208 to the network through wired or wireless communication, wherein the facial landmarks 220 on the facial image 208, or the application result obtained using the facial landmarks 220 on the facial image 208 is received from the processor module 104 through the buses 114.

The memory module 106 further stores training stage program instructions, and the training stage program instructions are executed by the processor module 104, which causes the processor module 104 to perform a training stage method 1400 (labeled in FIG. 14) for the facial landmark obtaining software system 200.

In the above embodiment, the terminal 100 is one type of computing system all of components of which are integrated together by the buses 114. Other types of computing systems such as a computing system that has a remote camera module instead of the camera module 102 are within the contemplated scope of the present disclosure.

Figure 2:
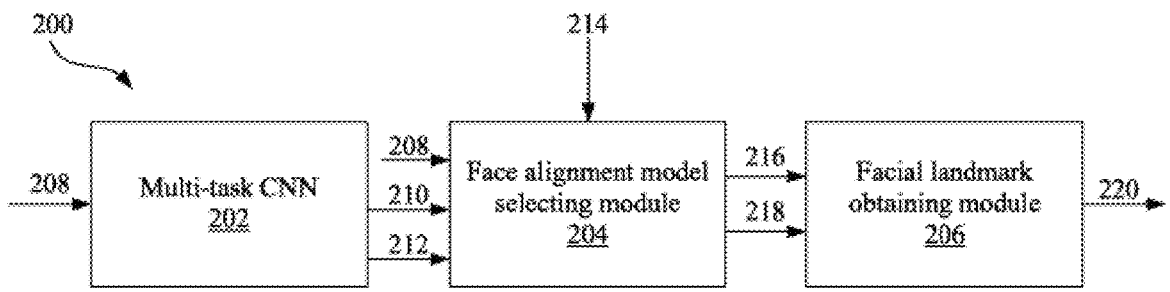
FIG. 2 is a block diagram illustrating a facial landmark obtaining software system in accordance with an embodiment of the present disclosure.

FIG. 2 is a block diagram illustrating a facial landmark obtaining software system 200 in accordance with an embodiment of the present disclosure. The facial landmark obtaining software system 200 includes a multi-task convolutional neural network (CNN) 202, a face alignment model selecting module 204, and a facial landmark obtaining module 206.

The multi-task CNN 202 is configured to receive the facial image 208, and obtain a detected face location 210 and data 212 for obtaining a facial characteristic category set of a plurality of first facial characteristic categories.

The face alignment model selecting module 204 is configured to receive the facial image 208, the detected face location 210, and the data 212, obtain the facial characteristic category set using the data 212, select a face alignment model 218 from a plurality of face alignment models 214 based on the facial characteristic category set, and output a cropped facial image 216 and the face alignment model 218. The cropped facial image 216 is obtained by cropping the facial image 208 using the detected face location 210.

The facial landmark obtaining module 206 is configured to receive the cropped facial image 216 and the face alignment model 218, and obtain a plurality of facial landmarks 220 using the face alignment model 218. The face alignment model 218 uses the cropped facial image 216.

Figure 3:
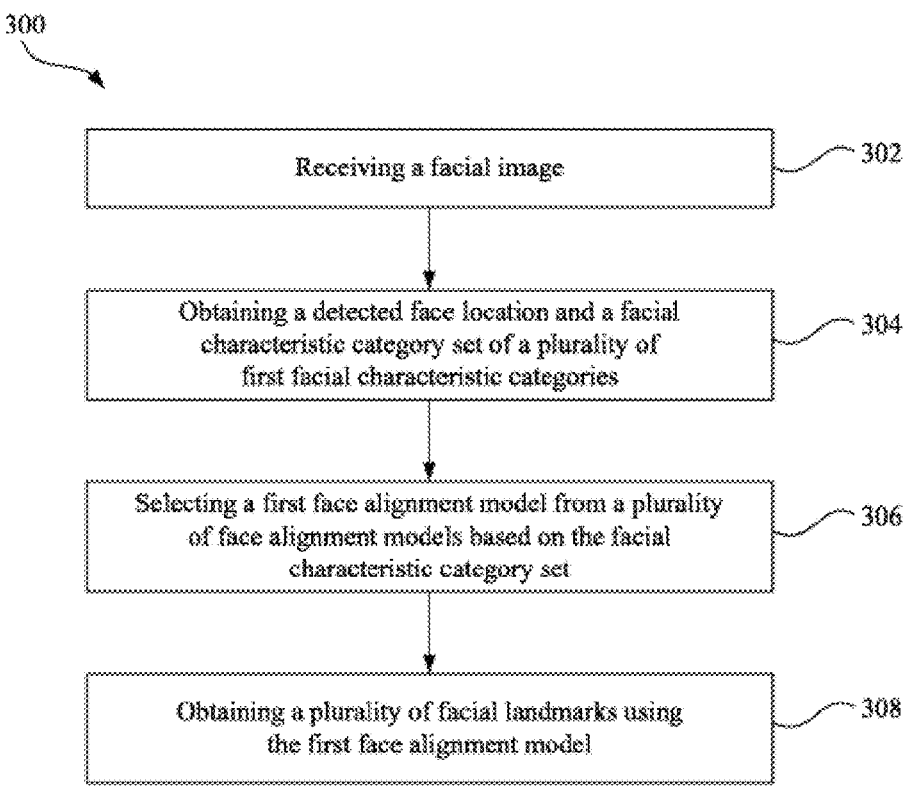
FIG. 3 is a flowchart illustrating a method performed by the facial landmark obtaining software system in FIG. 2 in accordance with an embodiment of the present disclosure.

FIG. 3 is a flowchart illustrating a method 300 performed by the facial landmark obtaining software system 200 in FIG. 2 in accordance with an embodiment of the present disclosure. The method 300 includes the following steps. Referring to FIGS. 2 and 3, in a step 302, a facial image is received. The facial image 208 is received by the multi-task CNN 202. In a step 304, a detected face location and a facial characteristic category set of a plurality of first facial characteristic categories are obtained using a multi-task CNN using the facial image. The detected face location 210 and the data 212 for obtaining the facial characteristic category set of the first facial characteristic categories are obtained by the multi-task CNN 202. The facial image 208 is input to the multi-task CNN 202. The facial characteristic category set of the first facial characteristic categories are obtained using the data 212 by the face alignment model selecting module 204. In a step 306, a first face alignment model is selected from a plurality of face alignment models based on the facial characteristic category set. The face alignment model 218 is selected from the face alignment models 214 based on the facial characteristic category set by the face alignment model selecting module 204. In a step 308, a plurality of facial landmarks are obtained using the first face alignment model using the facial image and the detected face location. The cropped facial image 216 is obtained by cropping the facial image 208 using the detected face location 210 by the face alignment model selecting module 204. The facial landmarks 220 are obtained using the face alignment model 218. The cropped facial image 216 is input to the face alignment model 218.

Figure 4:
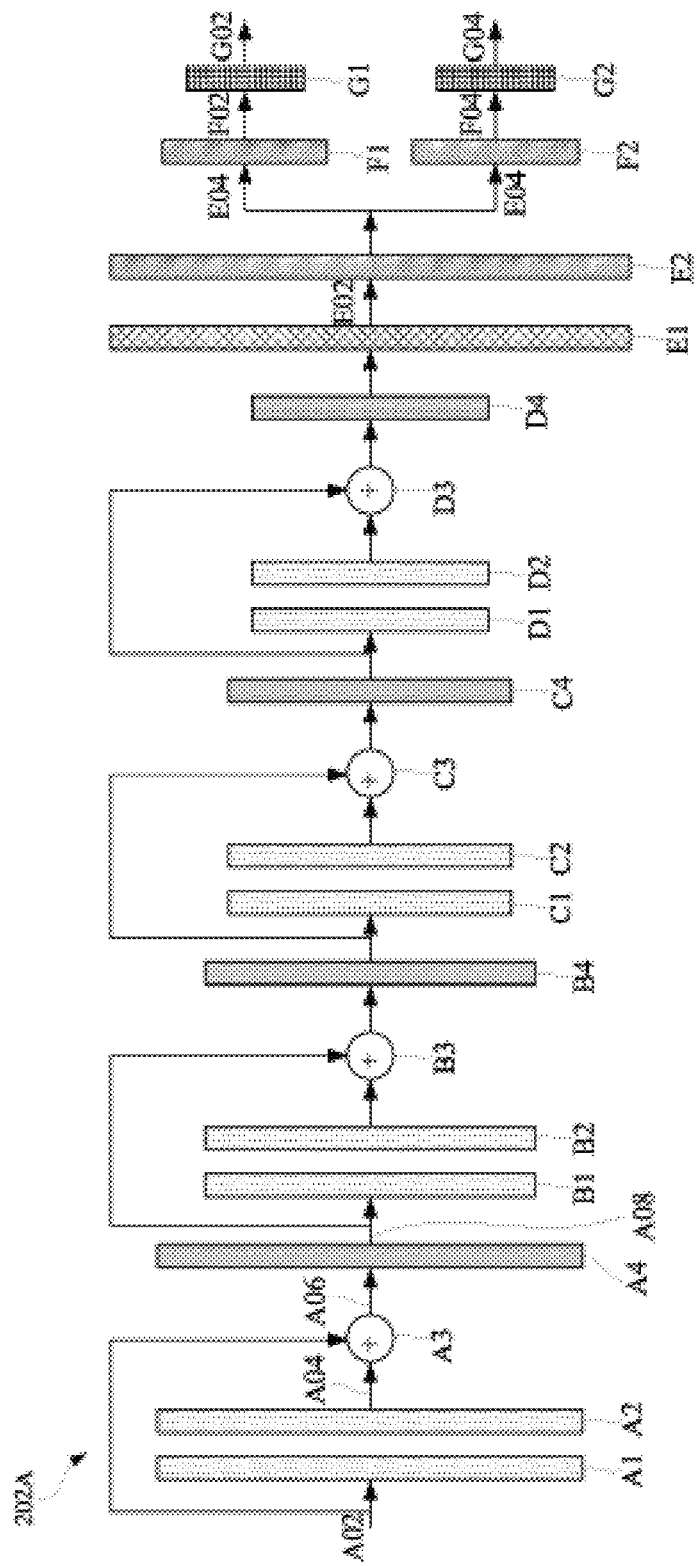
FIG. 4 is a block diagram illustrating a multi-task convolutional neural network (CNN) in the facial landmark obtaining software system in FIG. 2 in accordance with an embodiment of the present disclosure.

Referring to FIG. 2, the multi-task CNN 202 is configured to receive the facial image 208, and obtain the detected face location 210 and the data 212 for obtaining the facial characteristic category set of the first facial characteristic categories. FIG. 4 is a block diagram illustrating a multi-task CNN 202A in the facial landmark obtaining software system 200 in FIG. 2 in accordance with an embodiment of the present disclosure. The multi-task CNN 202A is a fully convolutional neural network (FCN). The multi-task CNN 202A includes a plurality of stages A to G.

The stages A to D are similar. For simplicity, only inputs and outputs for the layers of the stage A are labeled in FIG. 4. Each of inputs and outputs for the layers of the other stages B to D is referred to in the following using a label with a numeral same as the corresponding input or output of the stage A but with an alphabet of the corresponding stage B, . . . , or D. Each of the stages A to D is referred to as a stage X for description of common characteristics, and referred to as a corresponding stage A, . . . , or D for description of specific characteristics. The stage X includes a residual block X1-X3 and a downscaling layer X4. The residual block X1-X3 includes a layer X1 with a convolutional layer followed by an activation function, a layer X2 with a convolutional layer followed by an activation function, and a summation block X3. The layer X1 receives an input X02. For the stage A, the input A02 is the facial image 208. For each stage B, . . . , or D of the other stages B to D, the input is a plurality of corresponding feature maps B08, . . . , or D08 output from a corresponding previous stage A, . . . , or C. The feature maps are a plurality of feature maps corresponding to a plurality of channels of a multi-channel feature map, and are referred to as a multi-channel feature map in the following. The layers X1 and X2 processes layer-by-layer, and outputs a multi-channel feature map X04. The convolutional layers of the layers X1 and X2 have a kernel size of 3×3. Other kernel sizes of the convolutional layers of the layers X1 and X2 are within the contemplated scope of the present disclosure. The activation function of each of the layers X1 and X2 is a nonlinear activation function such as a parametric ReLU operation. Other types of the activation function of any of the layers X1 and X2 such as a leaky ReLU operation are within the contemplated scope of the present disclosure. The summation block X3 is configured to sum the multi-channel feature map X04 output by the layer X2 and the input X02 of the layer X1, and output a multi-channel feature map X06. The summation operation is an element-wise summation operation. A number of the channels of the multi-channel feature map A06 is thirty two. A number of the channels of the multi-channel feature map B06 is sixty four. A number of the channels of the multi-channel feature map C06 is one hundred and twenty eight. A number of the channels of the multi-channel feature map D06 is two hundred and fifty six. Other numbers of the channels of each of the multi-channel feature maps B06, C06, and D06 are within the contemplated scope of the present disclosure. The downscaling layer X4 is configured to downscale the multi-channel feature map X06 with a downscaling factor such as two and output a multi-channel feature map X08, which is an output of the stage X. A number of the channels of the multi-channel feature map X08 is same as the number of the channels of the multi-channel feature map X06. Each channel of the multi-channel feature map D08 for the stage D contains corresponding abstract features which are spatial information. The downscaling layer X4 is a pooling layer such as a max pooling layer. Other downscaling layers such as an average pooling layer and a convolutional layer with a stride of two are within the contemplated scope of the present disclosure. Other downscaling factors of the downscaling layer X4 are within the contemplated scope of the present disclosure.

The stage E includes a global pooling layer E1 and a layer E2 with a convolutional layer followed by an activation function. The global pooling layer E1 is configured to receive the multi-channel feature map D08, obtain corresponding global spatial information for each channel of the multi-channel feature map D08 (i.e. each feature map of a plurality of feature maps) with the corresponding spatial information, and output the multi-channel feature map E02. A number of the channels of multi-channel feature map E02 is two hundred and fifty six. The global pooling layer E1 is a global average pooling layer. Other global pooling layers such as a global max pooling layer are within the contemplated scope of the present disclosure. The layer E2 is configured to receive the multi-channel feature map E02 and output a multi-channel feature map E04. The convolutional layer of the layer E2 has a kernel size of 1×1. For each channel of the multi-channel feature map E04, the convolutional layer of the layer E2 obtain corresponding integrated information across all channels of the multi-channel feature map E02. The activation function of the layer E2 is a nonlinear activation function such as a parametric ReLU operation. Other types of the activation function of the layer X2 such as a leaky ReLU operation are within the contemplated scope of the present disclosure. A number of the channels of the multi-channel feature map E04 is five hundred and twelve. Other numbers of the channels of the multi-channel feature map E04 such as same as the number of the channels of the multi-channel feature map E02 are within the contemplated scope of the present disclosure.

The stage F includes a layer F1 with a convolutional layer followed by an activation function and a layer F2 with a convolutional layer followed by an activation function. The layer F1 is configured to receive the multi-channel feature map E04, extract features related to the detected face location G02, and output a multi-channel feature map F02. The layer F2 is configured to receive the multi-channel feature map E04, extract features related to the roll, yaw, and pitch face rotation angles G04, and output a multi-channel feature map E04. The convolutional layers of the layers F1 and F2 have a kernel size of 1×1. A number of the channels of each of the multi-channel feature maps F02 and F04 is one thousand and twenty four. The activation function of each of the layers F1 and F2 is a nonlinear activation function such as a parametric ReLU operation. Other types of the activation function of any of the layers F1 and F2 such as a leaky ReLU operation are within the contemplated scope of the present disclosure.

The stage G includes a convolutional layer G1 and a convolutional layer G2. The convolutional layer G1 is configured to receive the multi-channel feature map F02 and output the detected face location G02. The convolutional layer G1 has a kernel size of 1×1. The detected face location G02 is represented by a plurality of X and Y coordinates of at least one set of diagonal corners of a bounding box bounding a face in the facial image 208. A number of the at least one set of diagonal corners is one and a number of the X and Y coordinates is four. Alternatively, a number of the at least one set of diagonal corners is two and a number of the X and Y coordinates is eight. The convolutional layer G2 is configured to receive the multi-channel feature map F04 and output the roll, yaw, and pitch face rotation angles G04. The convolutional layer G2 has a kernel size of 1×1. In the above embodiment, face rotation (i.e. head pose) is represented by roll, yaw, and pitch face rotation angles G04. Other ways to represent face rotation such as face rotation angle intervals for representing face rotation are within the contemplated scope of the present disclosure. In the above embodiment, the detected face location G02 is the detected face location 210 (shown in FIG. 2), and the roll, yaw, and pitch face rotation angles G04 are the data 212 (shown in FIG. 2) for obtaining the facial characteristic category set of the first facial characteristic categories.

Figure 5:
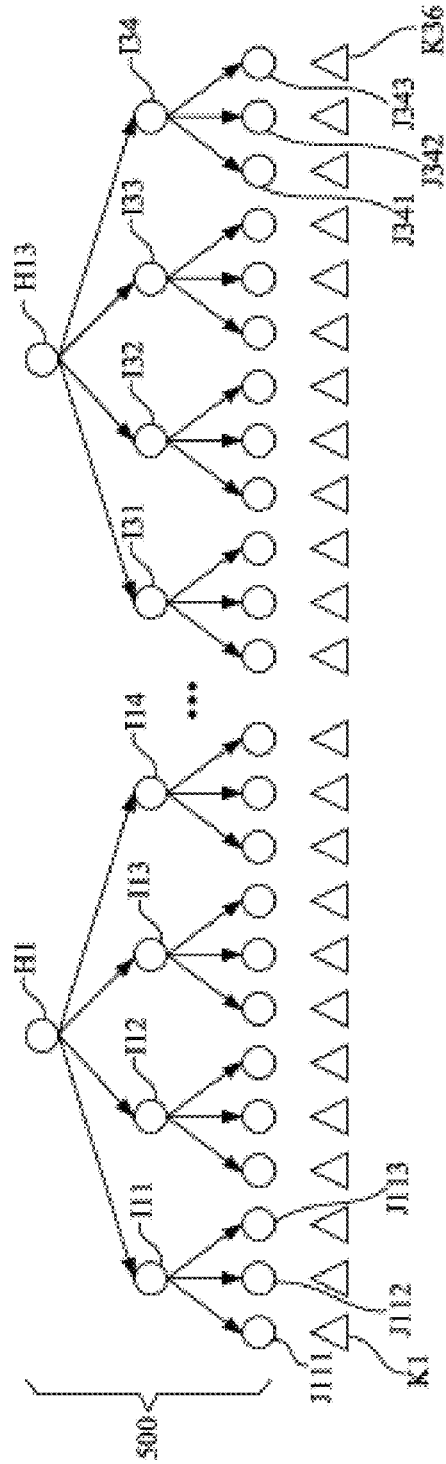
FIG. 5 is a diagram illustrating a hierarchy of the first facial characteristic categories and a plurality of face alignment models corresponding to a plurality of corresponding paths of the hierarchy of the first facial characteristic categories in accordance with an embodiment of the present disclosure.

Referring to FIG. 2, the face alignment model selecting module 204 is configured to obtain the facial characteristic category set of the first facial characteristic categories using the data 212 and select the face alignment model 218 from the face alignment models 214 based on the facial characteristic category set. FIG. 5 is a diagram illustrating a hierarchy 500 of the first facial characteristic categories and a plurality of face alignment models K1 to K36 corresponding to a plurality of corresponding paths H11-I11-J111 to H13-I34-J343 of the hierarchy 500 of the first facial characteristic categories in accordance with an embodiment of the present disclosure. The first facial characteristic categories are arranged hierarchically. The hierarchy 500 of the first facial characteristic categories includes a plurality of levels H, I, and J corresponding to a plurality of corresponding facial characteristics: roll face rotation, yaw face rotation, and pitch face rotation. Each facial characteristic corresponds to a corresponding plurality of second facial characteristic categories of the first facial characteristic categories. The second facial characteristic categories of the roll face rotation are a plurality of corresponding roll face rotation angle intervals: [−45°,−15°), [−15°, 15°], and (15°, 45°]. The second facial characteristic categories of the yaw face rotation are a plurality of corresponding yaw face rotation angle intervals: [−90°,−45°), [−45°, 0°], (0°, 45°], and (45°,90°]. The second facial characteristic categories of the pitch face rotation are a plurality of corresponding pitch face rotation angle intervals: [−45°,−15°), [−15°,15°], and (15°,45°]. Each first level H, I, or J includes at least one corresponding node set H1, I1 to I3, or J11 to J34. Each node set H1, I1, . . . , or I3, or J11, . . . , or J34 of the at least one node set H1, I1 to I3, or J11 to J34 includes a plurality of corresponding nodes H11 to H13, I11 to I14, . . . , or I31 to I34, or J111 to J113, . . . , or J341 to J343. The nodes H11 to H13 correspond to the corresponding second facial characteristic categories which are the corresponding roll face rotation angle intervals: [−45°,−15°), [45°,15°], and, (15°, 45°]. The node H11 branches into the nodes I11 to I14, the node H12 branches into the nodes I21 to I24, etc. The nodes I11 to I14 correspond to the corresponding second facial characteristic categories which are the corresponding yaw face rotation angle intervals: [−90°,−45°), [−45°,0°], (0°, 45°], and (45°,90°], and the I21 to I24 correspond to the corresponding second facial characteristic categories which are the corresponding yaw face rotation angle intervals: [−90°,−45°), [−45°,0°[, (0°,45°], and (45°,90°], etc. The node I11 branches into the nodes J111 to J113, the node I12 branches into the nodes J121 to J123, etc. The nodes J111 to J113 correspond to the corresponding second facial characteristic categories which are the corresponding pitch face rotation angle intervals: [−45°,−15°), [−15°,15°], and (15°, 45°], and the J121 to J123 correspond to the corresponding second facial characteristic categories which are the corresponding pitch face rotation angle intervals: [−45°,−15°), [−15°,15°], and (15°,45°], etc. When there are a plurality of the node sets I1 to I3, or J11 to J34, the corresponding second facial characteristic categories for each I1, . . . , or I3, or J11, . . . , or J34 of the node sets I1 to I3, or J11 to J34 are same. For example, the second facial characteristic categories for the node sets I1, I2, and I3 are all the yaw face rotation angle intervals: [−90°,−45°), [−45°,0°], (0°,45°], and (45°,90°].

An order of the facial characteristics from the highest level to the lowest level of the hierarchy 500 of the first facial characteristic categories above is exemplary. Other orders of the facial characteristics are within the contemplated scope of the present disclosure. A number of the face rotation angle intervals and ranges of angles for the face rotation angle intervals above are exemplary. Other numbers of the face rotation angle intervals and other ranges of angles for the face rotation angle intervals are within the contemplated scope of the present disclosure. In the above embodiment, the face rotation angle intervals are non-overlapping. Overlapping face rotation angle intervals such as face rotation angle intervals each adjacent two of which overlap by 10° to 15° are within the contemplated scope of the present disclosure.

The face alignment models K1 to K36 correspond to the paths H11-I11-J111 to H13-I34-J343 of the hierarchy 500 of the first facial characteristic categories. The path H11-I11-J111 corresponding to the face alignment model K1 is from the node H11 of the highest level H, through the node I11 of the first level I, to the node J111 of the lowest level J, the path H11-I11-J112 corresponding to the face alignment model K2 is from the node H11 of the highest level H, through the node I11 of the first level I, to the node J112 of the lowest level J, etc.

Figure 6:
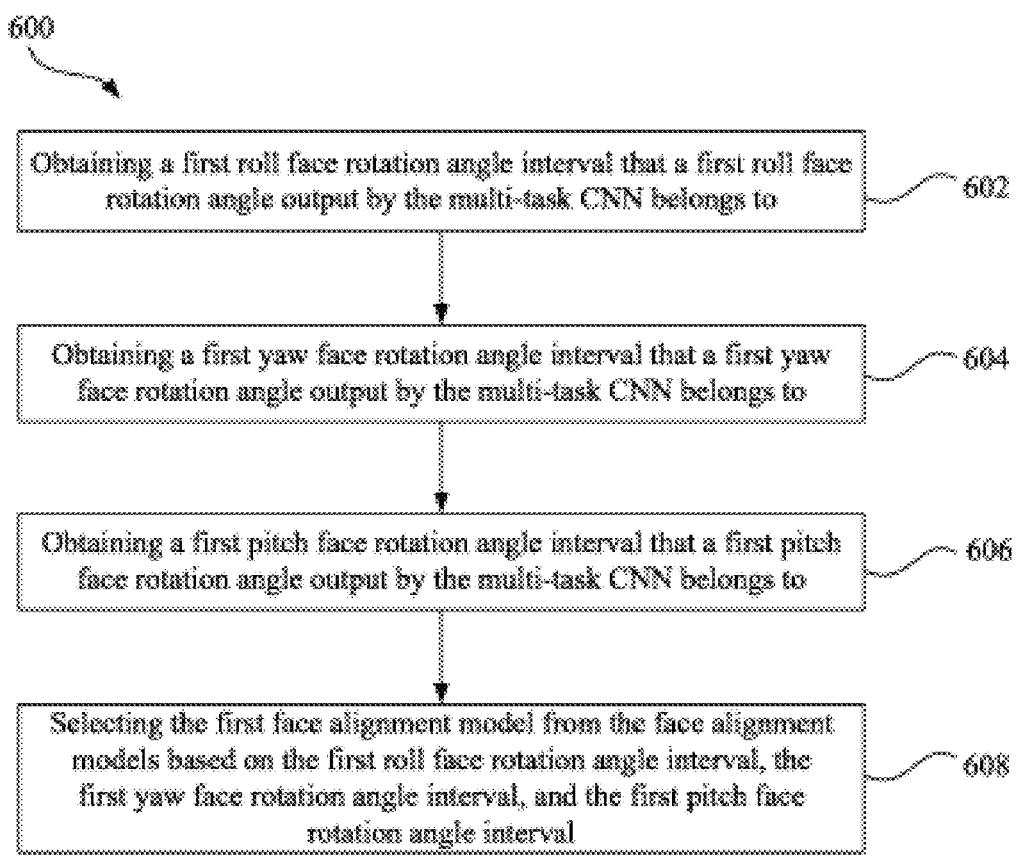
FIG. 6 is a flowchart illustrating a method performed by a face alignment model selecting module in the facial landmark obtaining software system in FIG. 2 in accordance with an embodiment of the present disclosure.
Figure 7:
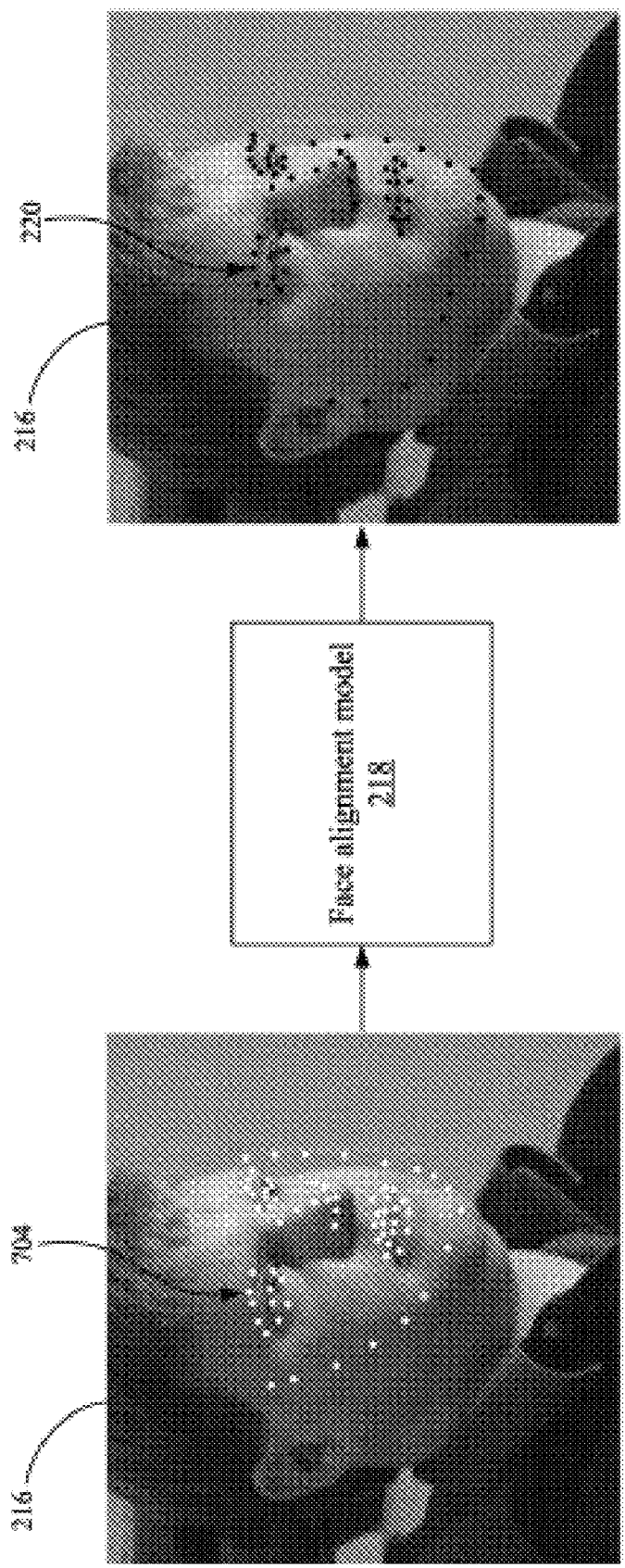
FIG. 7 is a block diagram illustrating a face alignment model used by a facial landmark obtaining module in the facial landmark obtaining software system in FIG. 2 in accordance with an embodiment of the present disclosure.

In the above embodiment, the roll, yaw, and pitch face rotation angles G04 (shown in FIG. 4) are the data 212 (shown in FIG. 2) for obtaining the facial characteristic category set of the first facial characteristic categories. FIG. 6 is a flowchart illustrating a method 600 performed by the face alignment model selecting module 204 in the facial landmark obtaining software system 200 in FIG. 2 in accordance with an embodiment of the present disclosure. Referring to FIGS. 4, 5, and 6, the method 600 performed by the face alignment model selecting module 204 includes the following steps. In a step 602, a first roll face rotation angle interval of the roll face rotation angle intervals: [−45°,−15°), [−15°,15°], and (15°,45°] that a first roll face rotation angle of the roll, yaw, and pitch face rotation angles G04 output by the multi-task CNN 202A belongs to is obtained. For an example of the facial image 208 (the cropped facial image 216 of which is shown in FIG. 7), the first roll face rotation angle is 3.1° and belongs to the first roll face rotation angle interval: [−15°,15°]. In a step 604, a first yaw face rotation angle interval of the yaw face rotation angle intervals: [−90°,45°), [−45°,0°], (0°,45°], and (45°,90°] that a first yaw face rotation angle of the roll, yaw, and pitch face rotation angles G04 output by the multi-task CNN 202A belongs to is obtained. For the example in FIG. 7, the first yaw face rotation angle is 62.7° and belongs to the first yaw face rotation angle interval: (45°,90°]. In a step 606, a first pitch face rotation angle interval of the pitch face rotation angle intervals: [−45°,−15°), [−15°,15°], and (15°,45°] that a first pitch face rotation angle of the roll, yaw, and pitch face rotation angles G04 output by the multi-task CNN 202A belongs to is obtained. For the example in FIG. 7, the first pitch face rotation angle is 0.89° and belongs to the first pitch face rotation angle interval: [−15°,15°]. In a step 608, the first face alignment model is selected from the face alignment models K1 to K36 based on the first roll face rotation angle interval, the first yaw face rotation angle interval, and the first pitch face rotation angle interval. The facial characteristic category set includes the first facial characteristic categories (i.e. the first roll face rotation angle interval: [−15°,15°], the first yaw face rotation angle interval: (45°,90°], and the first pitch face rotation angle interval: [−15°,15°]) of a path H12-I24-J242 of the hierarchy 500 of the first facial characteristic categories. The path H12-I24-J242 is from the node H12 of the highest level H, through the node I24 of the first level I, to the node J242 of the lowest level J, and corresponds to the first face alignment model K23. Therefore, first face alignment model K23 is selected.

In the embodiment above, the data 212 for obtaining the facial characteristic category set of the first facial characteristic categories are the roll, yaw, and pitch face rotation angles G04. For the alternative way that represents face rotation by face rotation angle intervals which may be used by the multi-task CNN 202A, the steps 602, 604, and 606 may not be necessary.

FIG. 7 is a block diagram illustrating a face alignment model 218 used by the facial landmark obtaining module

206 in the facial landmark obtaining software system 200 in FIG. 2 in accordance with an embodiment of the present disclosure. Referring to FIGS. 2, 5 and 7, for the example above, the face alignment model 218 is the face alignment model K23. In the following, the face alignment model 218 being the face alignment model K23 is used as an example for illustration. The description for the face alignment model 218 being the face alignment model K23 can be applied mutatis mutandis to the face alignment model 218 being another face alignment model such as another one of the face alignment models K1 to K36 or one of the face alignment models M1 to M72 to be described with reference to FIG. 10. The face alignment model 218 is configured to receive the cropped facial image 216, a plurality of initial facial landmarks 704, and obtain the facial landmarks 220. The initial facial landmarks 704 include a plurality of first facial landmarks for facial components such as eyebrows, eyes, a nose, and a mouth, and a plurality of second facial landmarks for a facial contour, forming a first facial shape. A number of the initial facial landmarks 704 is sixty eight. Other numbers of the initial facial landmarks 704 are within the contemplated scope of the present disclosure. The facial landmarks 220 also include a plurality of third facial landmarks for the facial components, and a plurality of fourth facial landmarks for the facial contour, forming a second facial shape. A number of the facial landmarks 220 is same as the number of the initial facial landmarks 704. An accuracy of the facial landmarks 220 obtained by the face alignment model 218 is dependent on the initial facial landmarks 704. The face alignment model 218 uses a cascaded regression method such as a supervised descent method (SDM). The face alignment model 218 using other types of face alignment methods accuracy of which depend on initialization such as a template fitting method and a deep learning-based method are within the contemplated scope of the present disclosure.

Figure 8:
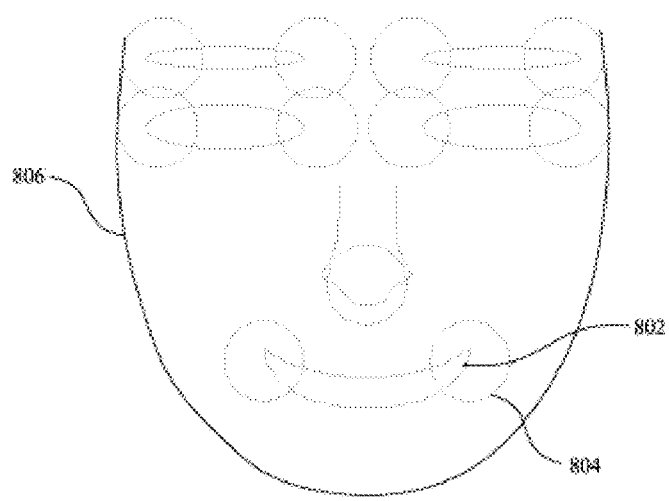
FIG. 8 is a diagram illustrating a local region used by the face alignment model which is a local model in accordance with an embodiment of the present disclosure.

FIG. 8 is a diagram illustrating a local region 804 used by the face alignment model 218 which is a local model in accordance with an embodiment of the present disclosure. The face alignment model 218 is a cascaded regression model and also a local model. Taking a facial landmark 802 as an example, the facial landmark 802 is regressed based on a feature extracted from a local region 804 around the facial landmark 802. The local region 804 is a circular region of a radius r and centered on a position of the facial landmark 802. In this way, because the facial landmark 802 is regressed without considering global texture of a face 806, an accuracy of a final facial landmark regressed from the facial landmark 802 depends heavily on an initial facial landmark for regressing the facial landmark 802.

Figure 9:
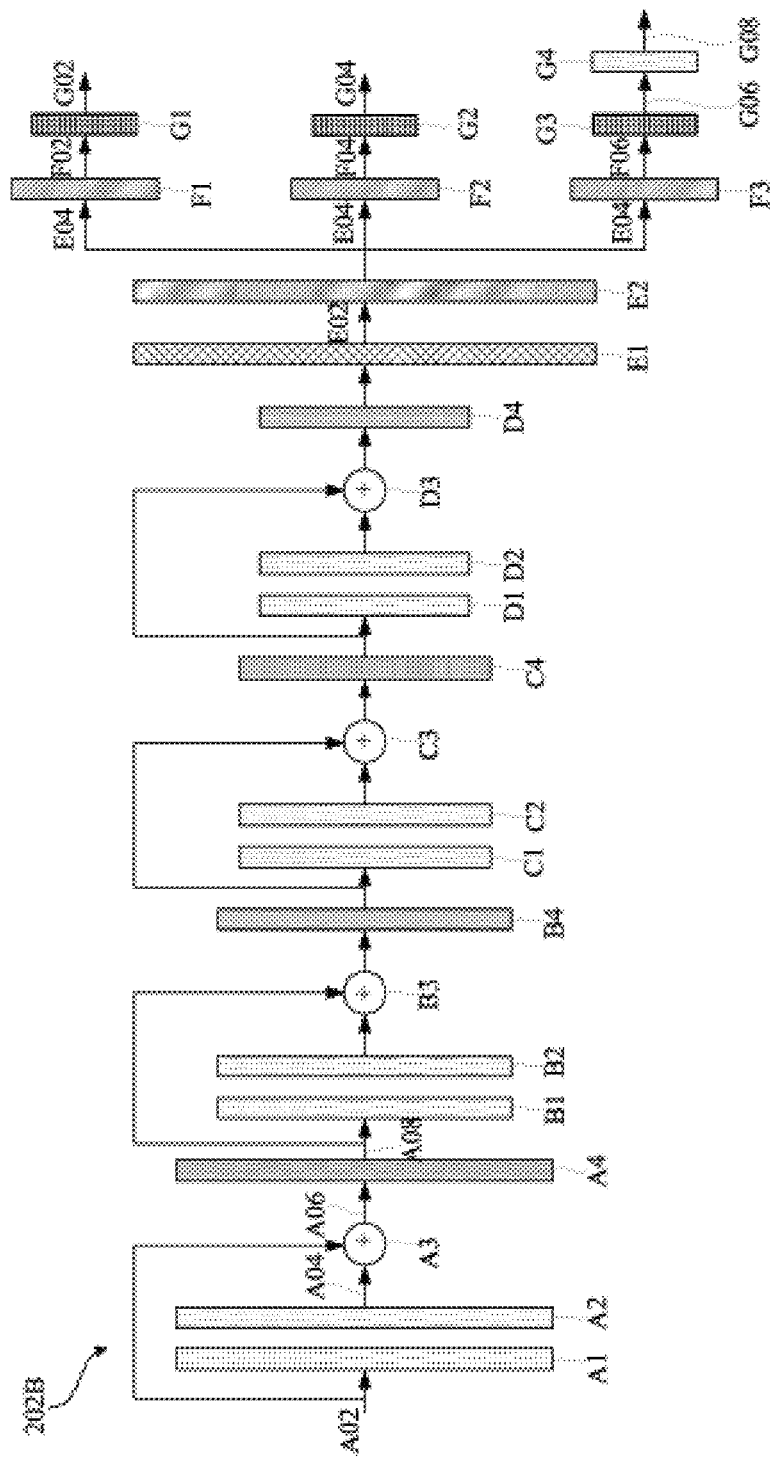
FIG. 9 is a block diagram illustrating a multi-task CNN in the facial landmark obtaining software system in FIG. 2 in accordance with another embodiment of the present disclosure.

FIG. 9 is a block diagram illustrating a multi-task CNN 202B in the facial landmark obtaining software system 200 in FIG. 2 in accordance with another embodiment of the present disclosure. Compared to the multi-task CNN 202A in FIG. 4, the multi-task CNN 202B in FIG. 9 employs a stage F further including a layer F3 with a convolutional layer followed by an activation function, and a stage G further including a convolutional layer G3 and a softmax layer G4. The layer F3 is configured to receive the multi-channel feature map E04, extract features related to neutral and non-neutral facial expression class outputs G06, and output a multi-channel feature map F06. The convolutional layer of the layer F3 has a kernel size of 1×1. A number of the channels of the multi-channel feature map F06 is one thousand and twenty four. The activation function of the layer F3 is a nonlinear activation function such as a parametric ReLU operation. Other types of the activation function of the layer F3 such as a leaky ReLU operation are within the contemplated scope of the present disclosure. The convolutional layer G3 is configured to receive the multi-channel feature map F06 and output the neutral and non-neutral facial expression class outputs G06. The softmax layer G4 is configured to receive the neutral and non-neutral facial expression class outputs G06 and output the neutral and non-neutral facial expression probabilities G08. In the above embodiment, non-neutral facial expressions such as crying, laughing, and being angry are grouped into one class being a class of a non-neutral facial expression. Other ways to categorize facial expressions such as different classes for different non-neutral facial expressions are within the contemplated scope of the present disclosure. In the above embodiment, the softmax layer G4 is used to output the neutral and non-neutral facial expression probabilities G08. Other activation functions for outputting neutral and non-neutral facial expression probabilities such as a sigmoid function are within the contemplate scope of the present disclosure. In the above embodiment, face rotation (i.e. head pose) is represented by roll, yaw, and pitch face rotation angles G04. In addition to the alternative way to represent face rotation described with respect to FIG. 4, an alternative way to represent face rotation such as only a yaw face rotation angle (i.e. a left-right rotation angle) for representing face rotation is within the contemplated scope of the present disclosure. In the above embodiment, the roll, yaw, and pitch face rotation angles G04 and the neutral and non-neutral facial expression probabilities G08 are the data 212 (shown in FIG. 2) for obtaining the facial characteristic category set of the first facial characteristic categories.

Figure 10:
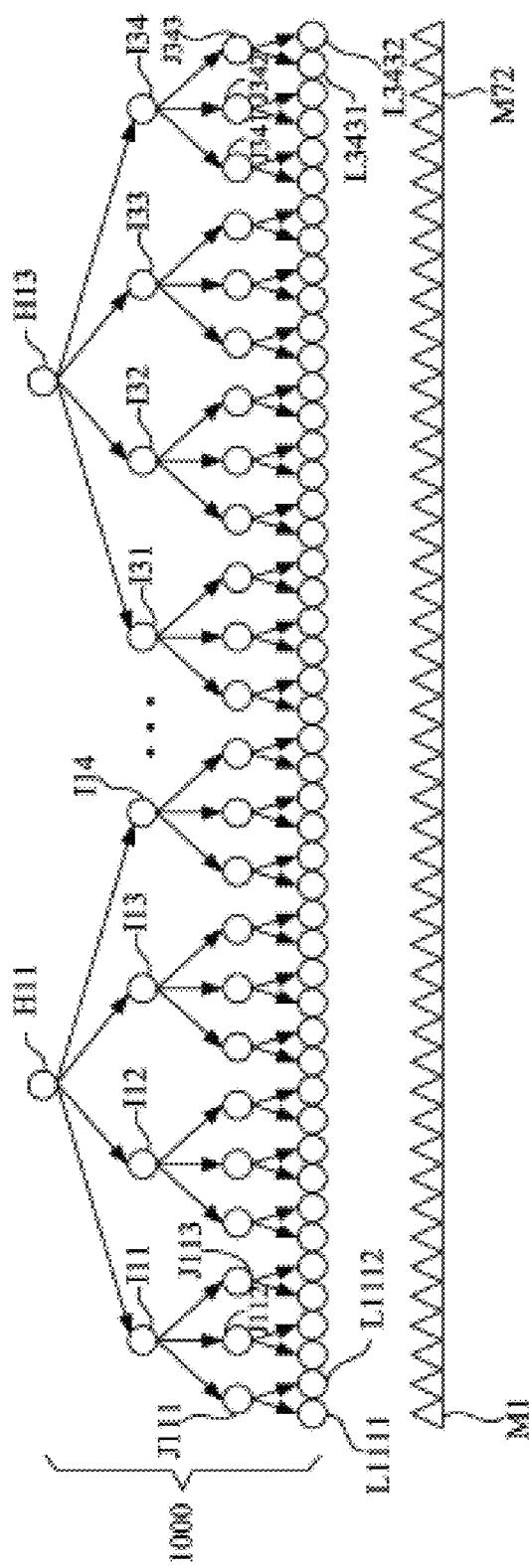
FIG. 10 is a diagram illustrating a hierarchy of the first facial characteristic categories and a plurality of face alignment models corresponding to a plurality of corresponding paths of the hierarchy of the first facial characteristic categories in accordance with another embodiment of the present disclosure.

FIG. 10 is a diagram illustrating a hierarchy 1000 of the first facial characteristic categories and a plurality of face alignment models M1 to M72 corresponding to a plurality of corresponding paths H11-I11-J111-L1111 to H13434-J343-L3432 of the hierarchy 1000 of first facial characteristic categories in accordance with another embodiment of the present disclosure. Compared to the hierarchy 500 of first facial characteristic categories in FIG. 5, the hierarchy 1000 of first facial characteristic categories in FIG. 10 further includes a level L below the level J. The description for each level H, I, or J of the hierarchy 500 of the first facial characteristic categories can be applied mutatis mutandis to the hierarchy 1000 of the first facial characteristic categories. The level L corresponds to a facial characteristic: a facial expression. The facial characteristic of level L corresponds to a plurality of second facial characteristic categories of the first facial characteristic categories. The second facial characteristic categories of the facial expression are a neutral facial expression and a non-neutral facial expression. The level L includes a plurality of node sets L111 to L343. Each node set L111, . . . , or L343 of the at least one node set L111 to L343 includes a plurality of corresponding nodes L1111 to L1112, . . . , or L3431 to L3432. The node J111 branches into the nodes L1111 to L1112, the node J112 branches into the nodes L1121 to L1122, etc. The nodes L1111 to L1112 correspond to the corresponding second facial characteristic categories which are correspondingly the neutral facial expression and the non-neutral facial expression, and the nodes L1121 to L1122 correspond to the corresponding second facial characteristic categories which are correspondingly the neutral facial expression and the non-neutral facial expression.

An order of the facial characteristics from the highest level to the lowest level of the hierarchy 1000 of the first facial characteristic categories above is exemplary. Other orders of the facial characteristics are within the contemplated scope of the present disclosure.

The face alignment models M1 to M72 correspond to the paths H11-I11-J111-L1111 to H13-I34-J343-L3432 of the hierarchy 1000 of the first facial characteristic categories. The path H11-I11-J111-L1111 corresponding to the face alignment model M1 is from the node H11 of the highest level H, through the node I11 of the first level I and the node J111 of the first level J, to the node L1111 of the lowest level L, the path H11-I11-J111-L1112 corresponding to the face alignment model M2 is from the node H11 of the highest level H, through the node I11 of the first level I and the node J111 of the first level J, to the node L1112 of the lowest level L, etc.

Figure 11:
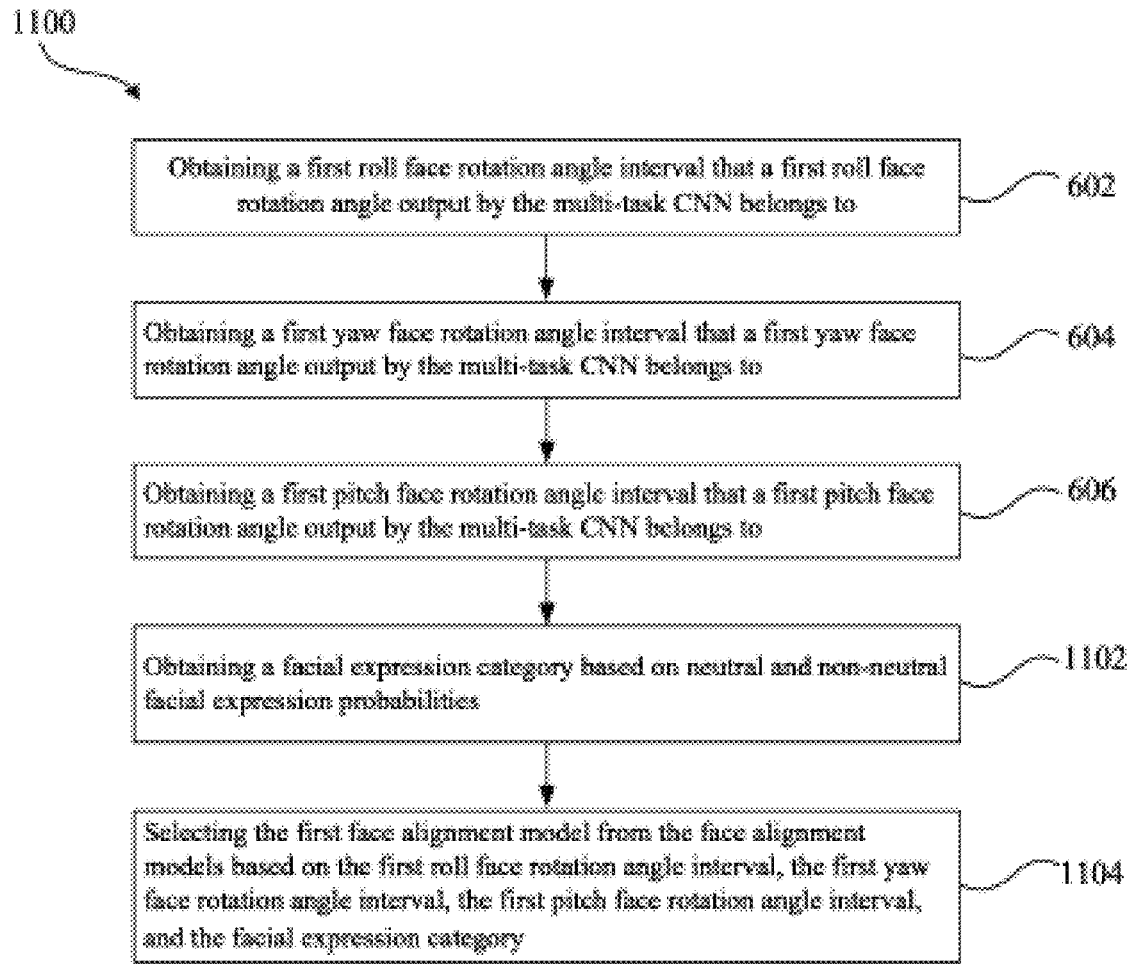
FIG. 11 is a flowchart illustrating a method performed by a face alignment model selecting module in the facial landmark obtaining software system in FIG. 2 in accordance with another embodiment of the present disclosure.

In the above embodiment, the roll, yaw, and pitch face rotation angles G04 (shown in FIG. 9) and the neutral and non-neutral facial expression probabilities G08 (shown in FIG. 9) are the data 212 (shown in FIG. 2) for obtaining the facial characteristic category set of the first facial characteristic categories. FIG. 11 is a flowchart illustrating a method 1100 performed by the face alignment model selecting module 204 in the facial landmark obtaining software system 200 in FIG. 2 in accordance with another embodiment of the present disclosure. Referring to FIGS. 9, 10, and 11, compared to the method 600 in FIG. 6 performed by the face alignment model selecting module 204, the method 1100 in FIG. 11 performed by the face alignment model selecting module 204 further includes a step 1102 and employs a step 1104 adapted from the step 608 for adding the step 1102. In the step 1102, a facial expression category is obtained based on neutral and non-neutral facial expression probabilities G08 (shown in FIG. 9). For an example of the facial image 208 (the cropped facial image 216 of which is shown in FIG. 7), a neutral facial expression probability of the neutral and non-neutral facial expression probabilities G08 is 92.5%, and a non-neutral facial expression probability of the neutral and non-neutral facial expression probabilities G08 is 7.5%. Therefore, the facial expression category is the neutral facial expression. In the step 1104, the first face alignment model is selected from the face alignment models M1 to M72 based on the first roll face rotation angle interval, the first yaw face rotation angle interval, and the first pitch face rotation angle interval, and the facial expression category. Following the example described with reference to FIG. 6, the facial characteristic category set includes the first facial characteristic categories (i.e. the first roll face rotation angle interval: [−15°,15°], the first yaw face rotation angle interval: (45°,90°], the first pitch face rotation angle interval: [−15°,15°], and the neutral facial expression) of a path H12-I24-J242-L2421 of the hierarchy 1000 of the first facial characteristic categories. The path H12-I24-J242-L2421 is from the node H12 of the highest level H, through the node I24 of the first level I and the node J242 of the first level J, to the node L2421 of the lowest level L and corresponds to the first face alignment model M45. Therefore, first face alignment model M45 is selected.

In the above example, the facial characteristic category set includes the first roll face rotation angle interval: [−15°,15°], the first yaw face rotation angle interval: (45°,90°], the first pitch face rotation angle interval: [−15°,15°], and the facial expression category: the neutral facial expression. For the alternative way that represents face rotation only by the yaw face rotation angle which may be used by the multi-task CNN 202B, the facial characteristic category set includes a roll face rotation angle interval such as [−15°,15°] and the facial expression category: the neutral facial expression.

Figure 12:
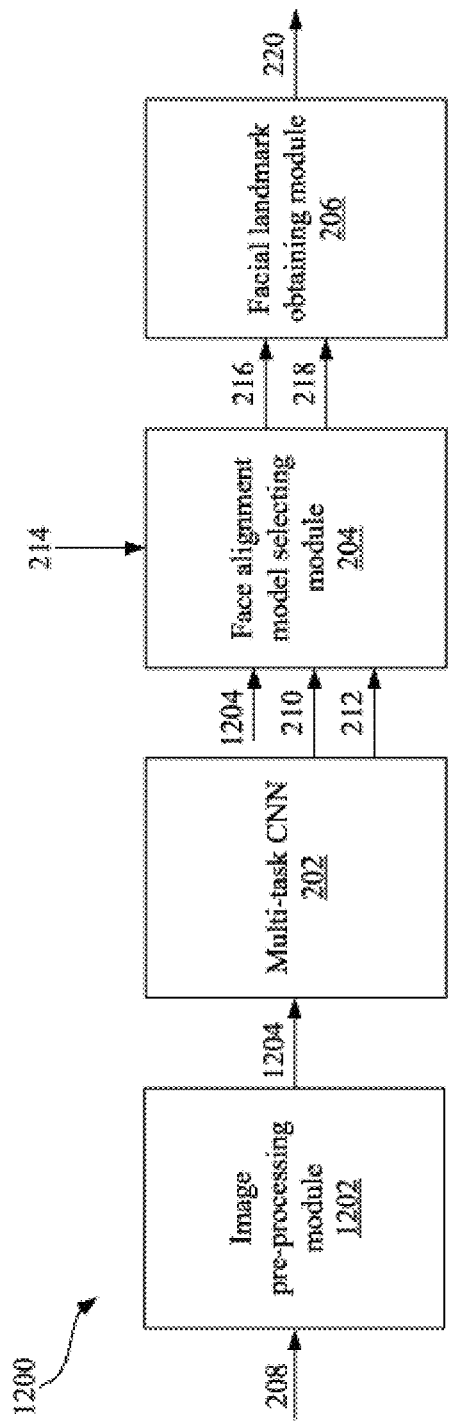
FIG. 12 is a block diagram illustrating a facial landmark obtaining software system in accordance with another embodiment of the present disclosure.

FIG. 12 is a block diagram illustrating a facial landmark obtaining software system 1200 in accordance with another embodiment of the present disclosure. Compared to the facial landmark obtaining software system 200 in FIG. 2, the facial landmark obtaining software system 1200 further includes an image pre-processing module 1202 before the multi-task CNN 202. The image pre-processing module 1202 is configured to receive the facial image 208, performing image pre-processing on the facial image 208 for reducing an impact of varying illumination condition on the multi-task CNN 202, and output a facial image 1204. The facial image 1204 instead of the facial image 208 as in FIG. 2 is input to the multi-task CNN 202 and the face alignment model selecting module 204. Image pre-processing is performed using gamma correction. Other image pre-processing techniques for reducing an impact of varying illumination condition such as multi-scale retinex (MSR) are within the contemplated scope of the present disclosure.

Figure 13:
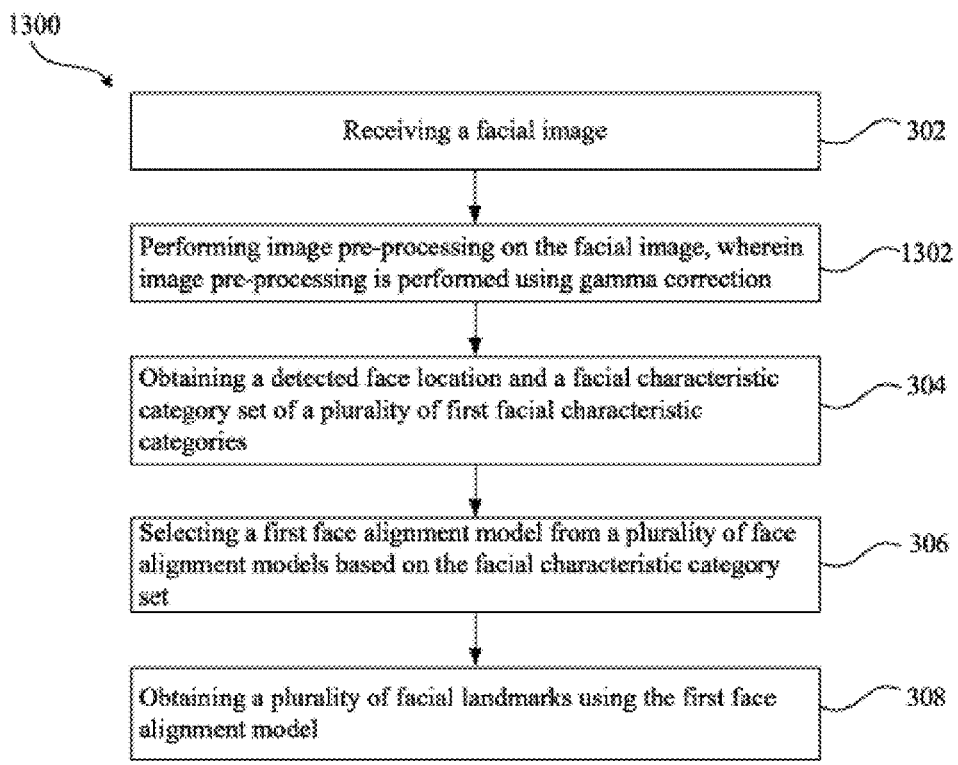
FIG. 13 is a flowchart illustrating a method performed by the facial landmark obtaining software system in FIG. 12 in accordance with another embodiment of the present disclosure.

FIG. 13 is a flowchart illustrating a method 1300 performed by the facial landmark obtaining software system 1200 in FIG. 12 in accordance with another embodiment of the present disclosure. Compared to the method 300 in FIG. 3 performed by the facial landmark obtaining software system 200 in FIG. 2, the method 1300 in FIG. 13 further includes a step 1302. Referring to FIGS. 12 and 13, in the step 1302, image pre-processing is performed on the facial image, wherein image pre-processing is performed using gamma correction. Image pre-processing is performed by the image pre-processing module 1202.

Figure 14:
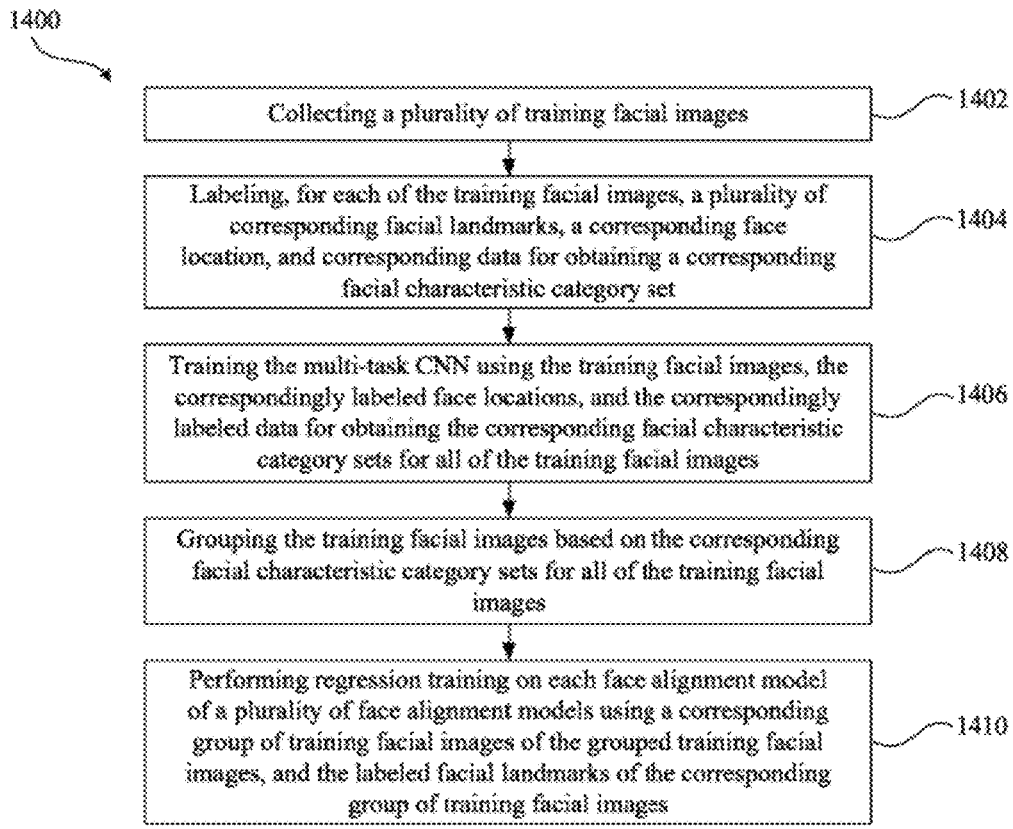
FIG. 14 is a flowchart illustrating a method for training the multi-task CNN and a plurality of face alignment models in accordance with another embodiment of the present disclosure.

FIG. 14 is a flowchart illustrating a method 1400 for training the multi-task CNN 202B (shown in FIG. 9) and the face alignment models M1 to M72 (shown in FIG. 10) in accordance with another embodiment of the present disclosure. The method 1400 for training the multi-task CNN 202B and the face alignment models M1 to M72 is provided as an example. The description for the method 1400 for training the multi-task CNN 202B and the face alignment models M1 to M72 can be applied mutatis mutandis to the multi-task CNN 202A (shown in FIG. 4) and the face alignment models K1 to K36 (shown in FIG. 5). The method 1400 include the following steps.

In a step 1402, a plurality of training facial images are collected.

In a step 1404, a plurality of corresponding facial landmarks, a corresponding face location, corresponding data for obtaining a corresponding facial characteristic category set are labeled for each of the training facial images. The facial landmarks including a plurality of fifth facial landmarks for facial components such as eyebrows, eyes, a nose, and a mouth, and a plurality of sixth facial landmarks for a facial contour are labeled. The fifth facial landmarks and the sixth facial landmarks form a third facial shape. A number of the facial landmarks that are labeled is sixth eight. Other numbers of the facial landmarks that are labeled are within the contemplated scope of the present disclosure. The face location represented by a plurality of X and Y coordinates of at least one set of diagonal corners of a bounding box bounding a face in each of the training facial images is labeled. The data which is roll, yaw, and pitch face rotation angles and data indicating a facial expression being neutral or non-neutral is labeled. The facial characteristic category set includes a plurality of first facial characteristic categories of a path of the hierarchy 1000 (shown in FIG. 15) of the first facial characteristic categories. The path is from a node of the highest level H to a node of the lowest level L.

In a step 1406, the multi-task CNN 202B are trained using the training facial images, the correspondingly labeled face locations, and the correspondingly labeled data for obtaining the corresponding facial characteristic category sets for all of the training facial images. During training, a plurality of tasks, i.e. obtaining a detected face location, obtaining roll, yaw, and pitch face rotation angles, and obtaining neutral and non-neutral facial expression probabilities, are performed simultaneously, building a synergy among the tasks and improving performance of the tasks.

In a step 1408, the training facial images are grouped based on the corresponding facial characteristic category sets for all of the training facial images. The grouped training facial images need to include a corresponding sufficient number of similar training images for each group of training facial images $N1, \ldots,$ or $N72$ (shown in FIG. 15) to attain good training performance and/or a small standard deviation of the corresponding labeled facial landmarks $O1, \ldots,$ or $O72$ of each group of training facial images $N1, \ldots,$ or $N72$. Each group of training facial images $N1, \ldots,$ or $N72$ correspond to a corresponding path $H11$-$I11$-$J111$-$L1111, \ldots,$ or $H13434$-$J343$-$L3432$ of the hierarchy 1000 of the first facial characteristic categories. A number of paths of the hierarchy 1000 of the first facial characteristic categories may be adjusted based on whether good training performance and/or a small standard deviation of labeled facial landmarks of each group of training facial images are attained. The number of paths may be adjusted, for example, by modifying a number of levels of the hierarchy 1000 of the first facial characteristic categories, and a number of facial characteristic categories for each of the at least one node set for any of the levels of hierarchy 1000 of the first facial characteristic categories.

In a step 1410, regression training is performed on each face alignment model $M1,$ or $M72$ of a plurality of face alignment models $M1$ to $M72$ using a corresponding group of training facial images $N1, \ldots,$ or $N72$ of the grouped training facial images, and the labeled facial landmarks $O1, \ldots,$ or $O72$ of the corresponding group of training facial images $N1, \ldots,$ or $N72$. The labeled facial landmarks $O1, \ldots,$ or $O72$ of the corresponding group of training facial images $N1, \ldots,$ or $N72$ are used as ground truth facial landmarks during training.

Figure 15:
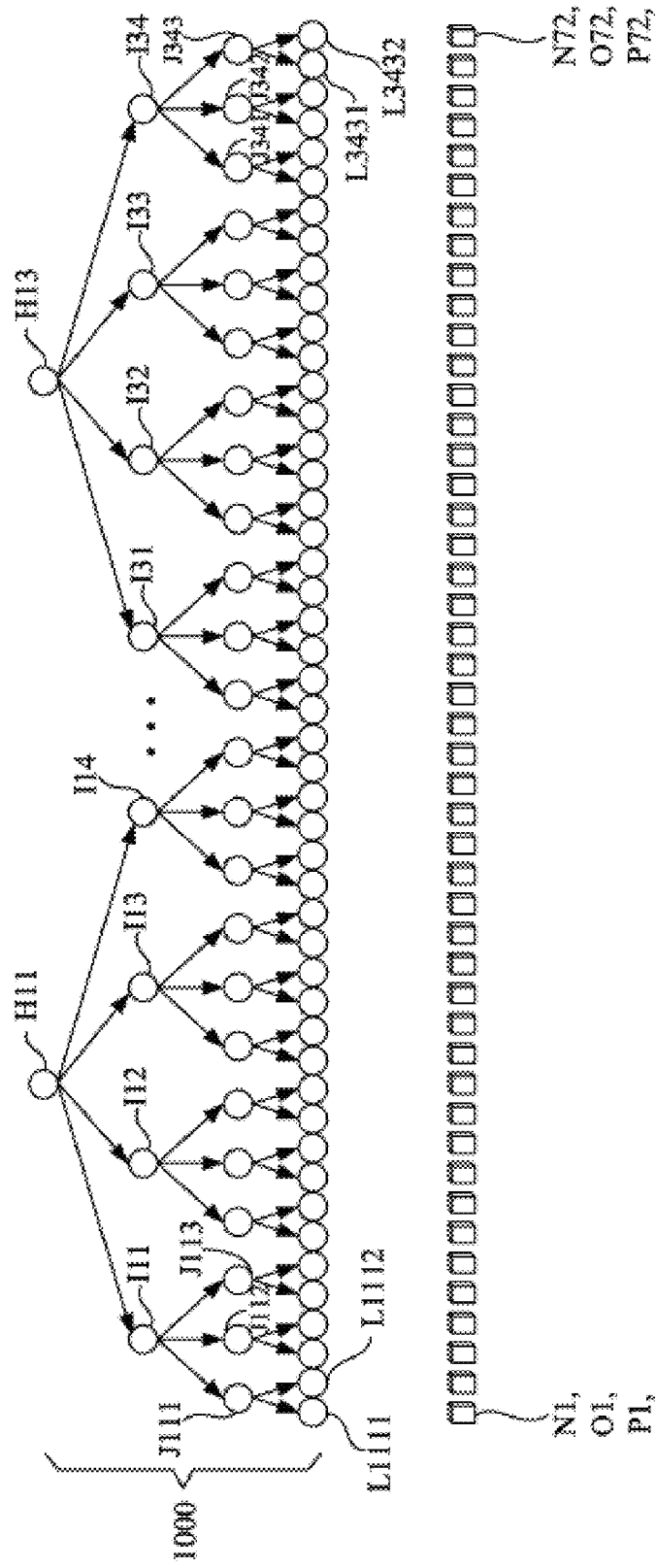
FIG. 15 is a diagram illustrating the hierarchy of first facial characteristic categories in FIG. 10 and a plurality of groups of data corresponding to a plurality of corresponding paths of the hierarchy of the first facial characteristic categories in accordance with an embodiment of the present disclosure.

FIG. 15 is a diagram illustrating the hierarchy 1000 of first facial characteristic categories in FIG. 10 and a plurality of groups of data $N1, O1,$ and $P1$ to $N72, O72,$ and $P72$ corresponding to a plurality of corresponding paths $H11$-$I11$-$J111$-$L1111$ to $H13$-$I34$-$J343$-$L3432$ of the hierarchy 1000 of first facial characteristic categories in accordance with an embodiment of the present disclosure. The description for the hierarchy 1000 of the first facial characteristic categories have been provided with reference to FIG. 10 and is omitted here. The groups of training facial images $N1$ to $N72$ and the corresponding labeled facial landmarks $O1, \ldots,$ or $O72$ of each group of training facial images $N1, \ldots,$ or $N72$ have been described with reference to FIG. 14. A corresponding average $P1, \ldots,$ or $P72$ of the corresponding labeled facial landmarks $O1, \ldots,$ or $O72$ of each group of training facial images $N1, \ldots,$ or $N72$ is used as a corresponding plurality of initial facial landmarks for each face alignment model $M1, \ldots,$ or $M72$ in FIG. 10. Following the example described with reference to FIG. 11, the initial facial landmarks 704 (shown in FIG. 7) are an average $P45$ of the labeled facial landmarks $O45$ of the group of training facial images $N45$.

Some embodiments have one or a combination of the following features and/or advantages. In a first related art, a first yaw face rotation angle interval of a plurality of yaw face rotation angle intervals is obtained for a facial image. A first face alignment model is selected from a plurality of face alignment models based on the first yaw face rotation angle interval. The face alignment models correspond to the corresponding yaw face rotation angle intervals.

In contrast, in some embodiments of the present disclosure, a facial characteristic category set of a plurality of first facial characteristic categories is obtained for a facial image. The first facial characteristic categories are arranged hierarchically. The facial characteristic category set includes the first facial characteristic categories of a path of the hierarchy of the first facial characteristic categories. The path is from the highest level of the hierarchy of the first facial characteristic categories to the lowest level of the hierarchy of the first facial characteristic categories. A first face alignment model is selected from a plurality of face alignment models based on the facial characteristic category set. The face alignment models correspond to a plurality of corresponding paths of the hierarchy of the first facial characteristic categories. Each path is from the highest level of the hierarchy of the first facial characteristic categories to the lowest level of the hierarchy of the first facial characteristic categories. Different facial characteristics such as roll face rotation, yaw face rotation, pitch face rotation, and a facial expression correspond to different levels of the hierarchy of the first facial characteristic categories. In this way, the face alignment models may be trained using a corresponding plurality of groups of training facial images. The groups of training facial images correspond to the corresponding paths of the hierarchy of the first facial characteristic categories. Therefore, training performance is improved. In addition, each of the face alignment models may use a corresponding plurality of initial facial landmarks. The corresponding initial facial landmarks are a corresponding average of a plurality of corresponding labeled facial landmarks of each group of the training facial images. Hence, accuracy of a plurality of facial landmarks obtained using the first face alignment model with the initial facial landmarks corresponding to the first face alignment model as an input is improved. As a result, the embodiments of the present disclosure is more robust for facial images with varying roll face rotation angles, pitch face rotation angles, and/or facial expressions.

In a second related art, a multi-task CNN is configured to perform tasks including face detection, landmark localization, pose estimation, and gender classification. The multi-task CNN employs a fully connected layer in between a plurality of first stages that build a synergy among the tasks, and a plurality of second stages that are split into a plurality of branches finally correspondingly predicting labels of the tasks.

In contrast, in some embodiments of the present disclosure, a multi-task CNN is configured to perform tasks including obtaining a detected face location and data for obtaining a facial characteristic category set. The multi-task CNN includes a global pooling layer followed by a 1×1 convolutional layer in between a plurality of first stages that build a synergy among the tasks, and a plurality of second stages that are split into a plurality of branches finally correspondingly predicting the detected face location and the data for obtaining the facial characteristic category set. The global pooling layer obtains global spatial information for each of channels of a first multi-channel feature map generated by a last of the first stages, and output a second multi-channel feature map. The 1×1 convolutional layer obtain integrated information across all channels of the second multi-channel feature map. Compared to the fully connected layer in the second related art that cannot generate global spatial information and/or integrated information, the global pooling layer and the 1×1 convolutional layer of the present disclosure not only provides global learning at a same level of abstraction, but also provides integrated learning among different levels of abstraction. Therefore, the multi-task CNN of the present disclosure yields better performance than the multi-task CNN of the second related art.

A person having ordinary skill in the art understands that each of the units, modules, layers, blocks, algorithm, and steps of the system or the computer-implemented method described and disclosed in the embodiments of the present disclosure are realized using hardware, firmware, software, or a combination thereof. Whether the functions run in hardware, firmware, or software depends on the condition of application and design requirement for a technical plan. A person having ordinary skill in the art can use different ways to realize the function for each specific application while such realizations should not go beyond the scope of the present disclosure.

It is understood that the disclosed system, and computer-implemented method in the embodiments of the present disclosure can be realized with other ways. The above-mentioned embodiments are exemplary only. The division of the modules is merely based on logical functions while other divisions exist in realization. The modules may or may not be physical modules. It is possible that a plurality of modules are combined or integrated into one physical module. It is also possible that any of the modules is divided into a plurality of physical modules. It is also possible that some characteristics are omitted or skipped. On the other hand, the displayed or discussed mutual coupling, direct coupling, or communicative coupling operate through some ports, devices, or modules whether indirectly or communicatively by ways of electrical, mechanical, or other kinds of forms.

The modules as separating components for explanation are or are not physically separated. The modules are located in one place or distributed on a plurality of network modules. Some or all of the modules are used according to the purposes of the embodiments.

If the software function module is realized and used and sold as a product, it can be stored in a computer readable storage medium. Based on this understanding, the technical plan proposed by the present disclosure can be essentially or partially realized as the form of a software product. Or, one part of the technical plan beneficial to the conventional technology can be realized as the form of a software product. The software product is stored in a computer readable storage medium, including a plurality of commands for at least one processor of a system to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program instructions.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A computer-implemented method, comprising:
   receiving a facial image;
   obtaining, using a multi-task convolutional neural network using the facial image, a detected face location and a facial characteristic category set of a plurality of first facial characteristic categories,
   wherein the first facial characteristic categories are arranged hierarchically, wherein a hierarchy of the first facial characteristic categories comprises a plurality of first levels corresponding to a plurality of corresponding facial characteristics,
   wherein each facial characteristic corresponds to a corresponding plurality of second facial characteristic categories of the first facial characteristic categories, and
   wherein each first level comprises at least one corresponding node set,
   wherein each of the at least one node set comprises a plurality of corresponding nodes, wherein the nodes correspond to the corresponding second facial characteristic categories, and
   wherein when there are a plurality of the node sets, the corresponding second facial characteristic categories for each of the node sets are same;
   wherein the facial characteristic category set comprises the first facial characteristic categories of a path of the hierarchy of the first facial characteristic categories, wherein the path is from one node of the at least one node set of the highest level of the first levels to one node of the at least one node set of the lowest level of the first levels;
   selecting a first face alignment model from a plurality of face alignment models based on the facial characteristic category set, wherein the face alignment models correspond to a plurality of corresponding paths of the hierarchy of the first facial characteristic categories, wherein each path is from a corresponding node of the at least one node set of the highest level of the first levels to a corresponding node of the at least one node set of the lowest level of the first levels; and
   obtaining, using the first face alignment model using the facial image and the detected face location, a plurality of facial landmarks.

2. The computer-implemented method of claim 1, wherein an accuracy of the facial landmarks obtained using the first face alignment model is dependent on a plurality of initial facial landmarks, wherein the initial facial landmarks are an average of labeled facial landmarks of all training facial images corresponding to the path.

3. The computer-implemented method of claim 2, wherein the first face alignment model is a local model.

4. The computer-implemented method of claim 1,
   wherein the first levels comprise a second level, a third level, and a fourth level,
   wherein the facial characteristic of the second level is roll face rotation, and the corresponding second facial characteristic categories of each of the at least one corresponding node set of the second level are a plurality of corresponding roll face rotation angle intervals;
   wherein the facial characteristic of the third level is yaw face rotation, and the corresponding second facial characteristic categories of each of the at least one corresponding node set of the third level are a plurality of corresponding yaw face rotation angle intervals;
   wherein the facial characteristic of the fourth level is pitch face rotation, and the corresponding second facial characteristic categories of each of the at least one corresponding node set of the fourth level are a plurality of corresponding pitch face rotation angle intervals; and
   wherein the first facial characteristic categories of the path comprise one of the roll face rotation angle intervals, one of the yaw face rotation angle intervals, and one of the pitch face rotation angle intervals.

5. The computer-implemented method of claim 1, wherein the first levels comprise a second level,
wherein the facial characteristic of the second level is a facial expression, and the corresponding second facial characteristic categories of each of the at least one corresponding node set of the second level are a neutral facial expression and a non-neutral facial expression,
wherein the first facial characteristic categories of the path comprises one of the neutral facial expression and the non-neutral facial expression.

6. The computer-implemented method of claim 1, wherein the multi-task convolutional neural network comprises:
a global pooling layer configured to obtain global spatial information for each of a plurality of first feature maps, to output a plurality of second feature maps; and
a convolutional layer having a kernel size of 1×1 and configured to receive the second feature maps and obtain integrated information across the second feature maps.

7. The computer-implemented method of claim 6, wherein the multi-task convolutional neural network is a fully convolutional neural network.

8. A system, comprising:
at least one memory configured to store program instructions;
at least one processor configured to execute the program instructions, which cause the at least one processor to perform steps comprising:
receiving a facial image;
obtaining, using a multi-task convolutional neural network using the facial image, a detected face location and a facial characteristic category set of a plurality of first facial characteristic categories,
wherein the first facial characteristic categories are arranged hierarchically, wherein a hierarchy of the first facial characteristic categories comprises a plurality of first levels corresponding to a plurality of corresponding facial characteristics,
wherein each facial characteristic corresponds to a corresponding plurality of second facial characteristic categories of the first facial characteristic categories, and
wherein each first level comprises at least one corresponding node set,
wherein each of the at least one node set comprises a plurality of corresponding nodes, wherein the nodes correspond to the corresponding second facial characteristic categories, and
wherein when there are a plurality of the node sets, the corresponding second facial characteristic categories for each of the node sets are same;
wherein the facial characteristic category set comprises the first facial characteristic categories of a path of the hierarchy of the first facial characteristic categories, wherein the path is from one node of the at least one node set of the highest level of the first levels to one node of the at least one node set of the lowest level of the first levels;
selecting a first face alignment model from a plurality of face alignment models based on the facial characteristic category set, wherein the face alignment models correspond to a plurality of corresponding paths of the hierarchy of the first facial characteristic categories, wherein each path is from a corresponding node of the at least one node set of the highest level of the first levels to a corresponding node of the at least one node set of the lowest level of the first levels; and
obtaining, using the first face alignment model using the facial image and the detected face location, a plurality of facial landmarks.

9. The system of claim 8, wherein an accuracy of the facial landmarks obtained using the first face alignment model is dependent on a plurality of initial facial landmarks, wherein the initial facial landmarks are an average of labeled facial landmarks of all training facial images corresponding to the path.

10. The system of claim 9, wherein the first face alignment model is a local model.

11. The system of claim 8,
wherein the first levels comprise a second level, a third level, and a fourth level,
wherein the facial characteristic of the second level is roll face rotation, and the corresponding second facial characteristic categories of each of the at least one corresponding node set of the second level are a plurality of corresponding roll face rotation angle intervals;
wherein the facial characteristic of the third level is yaw face rotation, and the corresponding second facial characteristic categories of each of the at least one corresponding node set of the third level are a plurality of corresponding yaw face rotation angle intervals;
wherein the facial characteristic of the fourth level is pitch face rotation, and the corresponding second facial characteristic categories of each of the at least one corresponding node set of the fourth level are a plurality of corresponding pitch face rotation angle intervals; and
wherein the first facial characteristic categories of the path comprise one of the roll face rotation angle intervals, one of the yaw face rotation angle intervals, and one of the pitch face rotation angle intervals.

12. The system of claim 8,
wherein the first levels comprise a second level,
wherein the facial characteristic of the second level is a facial expression, and the corresponding second facial characteristic categories of each of the at least one corresponding node set of the second level are a neutral facial expression and a non-neutral facial expression,
wherein the first facial characteristic categories of the path comprises one of the neutral facial expression and the non-neutral facial expression.

13. The system of claim 8, wherein the multi-task convolutional neural network comprises:
a global pooling layer configured to obtain global spatial information for each of a plurality of first feature maps, to output a plurality of second feature maps; and
a convolutional layer having a kernel size of 1×1 and configured to receive the second feature maps and obtain integrated information across the second feature maps.

14. The system of claim 13, wherein the multi-task convolutional neural network is a fully convolutional neural network.

15. A non-transitory computer-readable medium with program instructions stored thereon, that when executed by at least one processor, cause the at least one processor to perform steps comprising:
receiving a facial image;
obtaining, using a multi-task convolutional neural network using the facial image, a detected face location and a facial characteristic category set of a plurality of first facial characteristic categories, wherein the first facial characteristic categories are arranged hierarchically, wherein a hierarchy of the first facial characteristic categories comprises a plurality of first levels corresponding to a plurality of corresponding facial characteristics, wherein each facial characteristic corresponds to a corresponding plurality of second facial characteristic categories of the first facial characteristic categories, and wherein each first level comprises at least one corresponding node set, wherein each of the at least one node set comprises a plurality of corresponding nodes, wherein the nodes correspond to the corresponding second facial characteristic categories, and wherein when there are a plurality of the node sets, the corresponding second facial characteristic categories for each of the node sets are same;

wherein the facial characteristic category set comprises the first facial characteristic categories of a path of the hierarchy of the first facial characteristic categories, wherein the path is from one node of the at least one node set of the highest level of the first levels to one node of the at least one node set of the lowest level of the first levels;

selecting a first face alignment model from a plurality of face alignment models based on the facial characteristic category set, wherein the face alignment models correspond to a plurality of corresponding paths of the hierarchy of the first facial characteristic categories, wherein each path is from a corresponding node of the at least one node set of the highest level of the first levels to a corresponding node of the at least one node set of the lowest level of the first levels; and obtaining, using the first face alignment model using the facial image and the detected face location, a plurality of facial landmarks.

16. The non-transitory computer-readable medium of claim 15, wherein an accuracy of the facial landmarks obtained using the first face alignment model is dependent on a plurality of initial facial landmarks, wherein the initial facial landmarks are an average of labeled facial landmarks of all training facial images corresponding to the path.

17. The non-transitory computer-readable medium of claim 16, wherein the first face alignment model is a local model.

18. The non-transitory computer-readable medium of claim 15, wherein the first levels comprise a second level, a third level, and a fourth level, wherein the facial characteristic of the second level is roll face rotation, and the corresponding second facial characteristic categories of each of the at least one corresponding node set of the second level are a plurality of corresponding roll face rotation angle intervals;

wherein the facial characteristic of the third level is yaw face rotation, and the corresponding second facial characteristic categories of each of the at least one corresponding node set of the third level are a plurality of corresponding yaw face rotation angle intervals;

wherein the facial characteristic of the fourth level is pitch face rotation, and the corresponding second facial characteristic categories of each of the at least one corresponding node set of the fourth level are a plurality of corresponding pitch face rotation angle intervals; and wherein the first facial characteristic categories of the path comprise one of the roll face rotation angle intervals, one of the yaw face rotation angle intervals, and one of the pitch face rotation angle intervals.

19. The non-transitory computer-readable medium of claim 15, wherein the first levels comprise a second level, wherein the facial characteristic of the second level is a facial expression, and the corresponding second facial characteristic categories of each of the at least one corresponding node set of the second level are a neutral facial expression and a non-neutral facial expression, wherein the first facial characteristic categories of the path comprises one of the neutral facial expression and the non-neutral facial expression.

20. The non-transitory computer-readable medium of claim 15, wherein the multi-task convolutional neural network comprises:

a global pooling layer configured to obtain global spatial information for each of a plurality of first feature maps, to output a plurality of second feature maps; and a convolutional layer having a kernel size of 1×1 and configured to receive the second feature maps and obtain integrated information across the second feature maps.

* * * * *